(12) United States Patent
Higashida et al.

(10) Patent No.: US 8,682,161 B2
(45) Date of Patent: Mar. 25, 2014

(54) OPTICAL DATA TRANSMISSION SYSTEM

(75) Inventors: Masaaki Higashida, Osaka (JP); Satoshi Ohyama, Hyogo (JP)

(73) Assignee: Panasonic Corporation, Osaka (JP)

( * ) Notice: Subject to any disclaimer, the term of this patent is extended or adjusted under 35 U.S.C. 154(b) by 261 days.

(21) Appl. No.: 13/091,179

(22) Filed: Apr. 21, 2011

(65) Prior Publication Data

US 2012/0050191 A1  Mar. 1, 2012

(30) Foreign Application Priority Data

Aug. 27, 2010 (JP) ................................. 2010-190302

(51) Int. Cl.
*H04B 10/20* (2011.01)
*H04J 14/00* (2006.01)
*H04B 10/00* (2013.01)

(52) U.S. Cl.
USPC ............... 398/58; 398/43; 398/178; 398/180; 385/24; 385/2; 385/14; 385/9; 385/45

(58) Field of Classification Search
None
See application file for complete search history.

(56) References Cited

U.S. PATENT DOCUMENTS

2001/0024542 A1*  9/2001  Aina et al. ....................... 385/24
2009/0202241 A1*  8/2009  Yu et al. .......................... 398/58

FOREIGN PATENT DOCUMENTS

| JP | 2000-517515 | 12/2000 |
| JP | 2009/508735 | 3/2009 |
| WO | WO 98/21838 | 5/1998 |
| WO | WO 2007/035739 | 3/2007 |

* cited by examiner

*Primary Examiner* — Ken Vanderpuye
*Assistant Examiner* — Merlin Brito Peguero
(74) *Attorney, Agent, or Firm* — Wenderoth, Lind & Ponack, L.L.P.

(57) ABSTRACT

An optical data transmission system for transmitting optical data in a flight vehicle, including a head end, optical splitter, N units of terminals that process optical data received from the optical splitter to display such as video, plural optical cables connected between the head end and the optical splitter and between the optical splitter and the terminals, and a seat group including N sets of passenger seats that transmit two-way optical data and are placed close to one another. The N units of terminals are placed in association with the respective N sets of seats. The optical splitter is placed in association with the seat group; sends optical data from the head end to the N units of terminals; and reversely unifies N-series optical data, different from one another, from the N units of terminals into one series and sends it to the head end.

20 Claims, 9 Drawing Sheets

OPTICAL DATA TRANSMISSION SYSTEM

BACKGROUND OF THE INVENTION

1. Field of the Invention

The present invention relates to a technique for an optical data transmission system, more particularly to that used inside an aircraft.

2. Background Art

In recent years, in-flight entertainment (IFE) systems have been introduced into aircrafts, allowing long-time travelers to enjoy comfortable travel owing to such as a movie, audio program, game, and Internet browsing service. Content data such as video, audio, and Internet data is usually stored in a server inside the aircraft and from there the data is sent to terminals through communication cables or wireless links. A terminal is usually placed at every passenger seat and composed of such as a unit for processing received information data, small-size video monitor, earphones, and controller.

As a conventional example related to this technical field, patent literature 1 discloses an IFE system including a server/switch unit, plural video display units, and plural fiber-optic cables. The server/switch unit includes plural servers, plural passenger-seat transceivers, and a switch. The switch provides data communications between a passenger-seat transceiver and plural servers, enabling each server to communicate with each passenger-seat transceiver through the switch. Each cable has connections to the head end and to a passenger side so that a video display unit transceiver is provided to a corresponding passenger-seat transceiver through a corresponding fiber-optic cable. Patent literature 1 claims that all the above components provide an IFE system extendable in a modular construction.

According to the technique disclosed in the above conventional example, however, the switch needs a power supply, and the switch itself has a complicated structure, limiting its downsizing and weight reduction. Conventionally, a server/switch unit and a passenger-seat transceiver are connected to each other one to one, causing a huge amount of wiring and a large amount of work for wiring. Further, the large amount of wiring increases the probability of failures (e.g. a break). Hence, a flight vehicle cannot be equipped with an IFE system freely.

PRIOR ART DOCUMENT

Patent Literature

[Patent literature 1] Japanese Translation of PCT Publication No. 2009-508735

SUMMARY OF THE INVENTION

An optical data transmission system of the present invention is a system for transmitting optical data. The system includes a head end for sending and receiving optical data; at least one first optical splitter as a passive element; N units of terminals for outputting video, audio, and/or other data by processing optical data received from the first optical splitter; plural optical cables connected between the head end and the first optical splitter and between the first optical splitter and the terminals, for transmitting optical data; and a seat group including N sets of seats arranged close to one another. The N units of terminals are respectively arranged in association with N sets of seats. The first optical splitter, placed in association with the seat group, splits one series of optical data from the head end and sends the resulting data to the N units of terminals.

Herewith, the first optical splitter, small-size and lightweight and requiring no power supply wiring, can be placed at a desired position that does not block passengers in a sheet arrangement of a flight vehicle. This enables constructing an optical data transmission system with a high degree of flexibility. Furthermore, with a first optical splitter being placed in association with a seat group, a seat group including N sets of seats, N units of terminals, and a first optical splitter are delivered in one set from a seat vendor, which facilitates installation and replacement of the system. Further, with optical cables being connected between the head end and the first optical splitter and between the first optical splitter and the N units of terminals, the entire path from the head end to the terminals is implemented with optical cables and the first optical splitter unifies N pieces of optical cables, which minimizes the total wiring length of optical cables. This enables compressing the component cost of optical cables while reducing electromagnetic interference (EMI) and the weight of the aircraft body, which compresses the system cost and fuel cost.

DETAILED DESCRIPTION OF PREFERRED EMBODIMENTS

Figure 1:
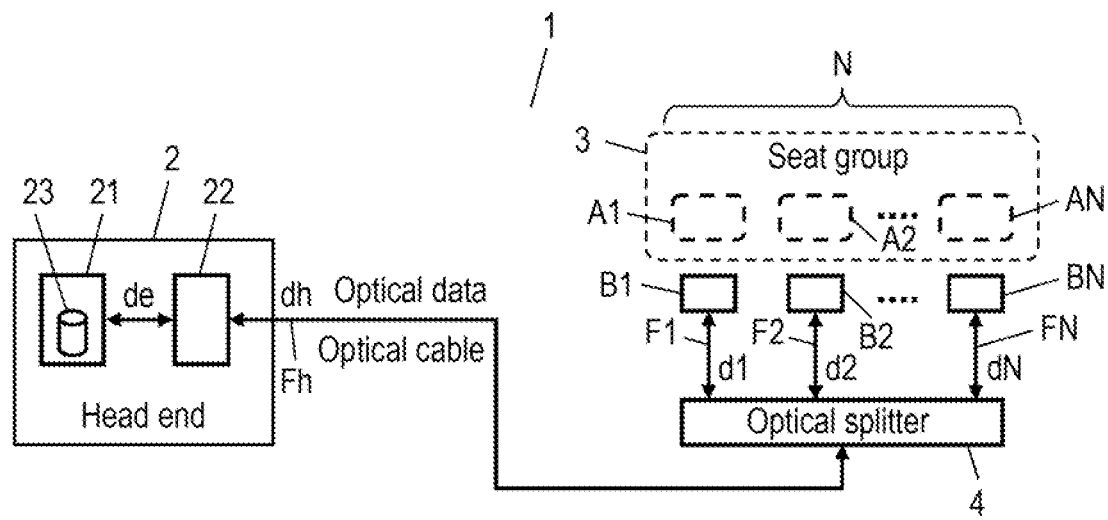
FIG. 1 is a block diagram showing a configuration example of an optical data transmission system according to an embodiment of the present invention.

Hereinafter, a description is made of some examples of an embodiment of the present invention with reference to the related drawings. In the drawings, a component with substantially the same configuration, action, and advantages is given the same reference mark. For example, the sequence (A1, A2, . . . , An) represents a group of reference marks whose suffix increments by one and is also described as (A1 to An). A mark in a drawing is used in an expression as a variable value representing the magnitude of a signal indicated by the mark.

(1) Optical Data Transmission System 1

Figure 8:
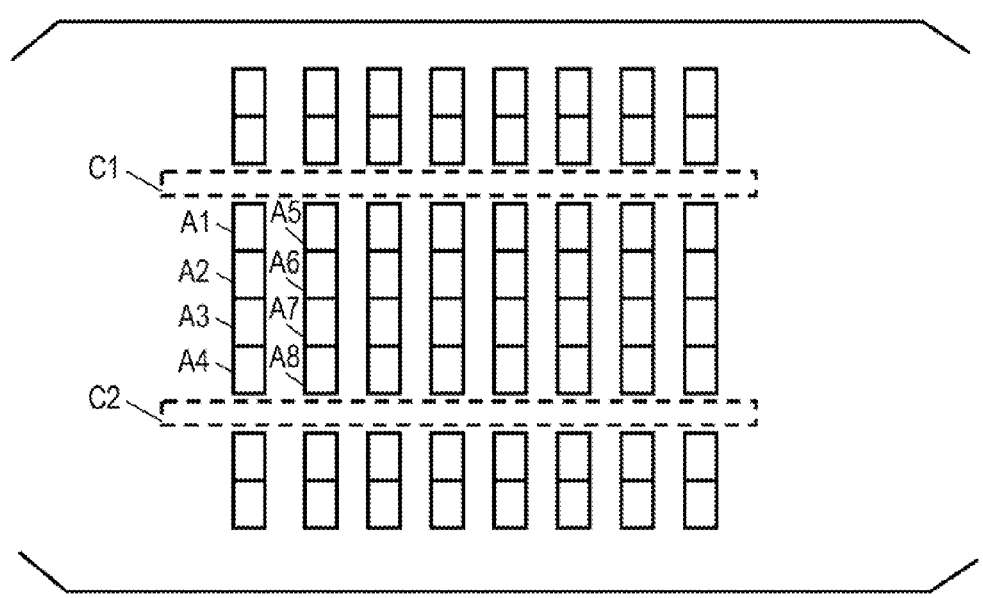
FIG. 8 is a plan view showing a typical example of a seat arrangement inside an aircraft (flight vehicle).

FIG. 1 is a block diagram showing a configuration example of optical data transmission system 1. System 1 is for transmitting optical data in a flight vehicle and includes head end 2; optical splitter 4 (first optical splitter); N (N is an integer larger than 1) pieces of terminals B1, B2, . . . , BN; plural pieces of optical cables Fh, F1, F2, . . . , FN; and seat group 3. Here, a description is made of a seat group. FIG. 8 is a plan view showing a typical example of a seat arrangement inside an aircraft (flight vehicle). In this example, 2-row, 4-row, and 2-row seats are arranged adjacently to one another separated by aisles C1, C2. Here, a group of plural seats arranged adjacently to one another is referred to as a seat row. In FIG. 8, the group of seats A1, A2, A3, A4 is an example of a seat row; the group of seats A5, A6, A7, A8 is another example. A seat group may be formed of one or more seat rows. Further, a seat group may be formed of plural sets of seats (including a case of only some seats in a seat row) positioned close to one another, regardless of a seat row. Alternatively, a seat group may be a group of seat arrangement such as a business-class seat arrangement.

Head end 2 sends and receives optical data dh. Optical splitter 4 is a passive element. Terminals B1 to BN process optical data d1, d2, . . . , dN received from optical splitter 4 to display such as video transmitted from head end 2. Optical cable Fh is connected between head end 2 and optical splitter 4; optical cables F1 to FN are connected in between optical splitter 4 and terminals B1 to BN, respectively. This allows optical cables Fh and F1 to FN to transmit two-way optical data dh and d1 to dN including downstream optical data (from head end 2 to respective terminals B1 to BN) and upstream optical data (from respective terminals B1 to BN to head end 2). The two-way optical communications are implemented by optical wavelength division multiplexing. Seat group 3 (indicated by the dotted-line frame) includes N sets of seats A1, A2, . . . , AN (indicated by dotted-line frames), where seats A1, A2, . . . , AN are for passengers and arranged close to one another.

Terminals B1 to BN correspond to seats A1 to AN and are arranged in association with seats A1 to AN, respectively. Optical splitter 4 is placed in association with seat group 3. Optical splitter 4 splits optical data dh from head end 2 and sends it to terminals B1 to BN; reversely, unifies N-series optical data d1 to dN (different from one another) from terminals B1 to BN into one series to sends it to head end 2.

Herewith, optical splitter 4, small-size and lightweight and requiring no power supply wiring, can be placed at a desired position that does not block passengers in a sheet arrangement of a flight vehicle. Particularly for a seat, optical splitter 4 can be placed at a position that does not block passengers or their feet. This enables constructing an optical data transmission system with a high degree of flexibility in an aircraft body and seat arrangement. Furthermore, with optical splitter 4 being placed in association with seat group 3, seat group 3 including seats A1 to AN, terminals B1 to BN, and optical splitter 4 are delivered in one set from a seat vendor, which facilitates installation and replacement of the system. Further, with optical cable Fh being connected between head end 2 and optical splitter 4, and with optical cables F1 to FN being connected between optical splitter 4 and terminals B1 to BN, respectively, the entire path from head end 2 to respective terminals B1 to BN is implemented with optical cables, and optical splitter 4 unifies N pieces of optical cables F1 to FN into optical cable Fh, which minimizes the total wiring length of optical cables Fh and F1 to FN. This enables compressing the component cost of optical cables while reducing electromagnetic interference (EMI) and the weight of the aircraft body, which compresses the system cost and fuel cost.

An example of the flight vehicle may be at least one of an aircraft, helicopter, airship, floating object connected to the ground, rocket, satellite, and space station.

(2) Head End 2

Head end 2 includes processing unit 21 and media converting unit 22. Processing unit 21 includes storing unit 23 to store content data such as movies and music in a compressed state. Processing unit 21 may receive communication data such as that on the Internet and telephone lines through wireless communications with a ground station. Processing unit 21 may generate N-series synchronous control data associated with terminals B1 to BN, respectively. Further, processing unit 21 may generate maintenance data for maintaining and monitoring optical data transmission system 1. Processing unit 21 generates electric data de including such content data, communication data, synchronous control data, and maintenance data.

Media converting unit 22 converts electric data de into downstream optical data using a light-emitting device such as a laser diode. Further, media converting unit 22 multiplexes downstream optical data with upstream optical data using a WDM (wavelength division multiplexing) filter to generate optical data dh. Media converting unit 22 sends and receives optical data dh through optical cable Fh. For example, a wavelength of 1.49 μm is used for downstream optical data; a wavelength of 1.31 μm is used for upstream optical data. In this case, optical cables Fh and F1 to FN are single-mode fiber-optic cables. This enables two-way communications by wavelength division multiplexing (WDM) by using optical cables Fh and F1 to FN (one each), which simplifies wiring of optical cables Fh and F1 to FN while reducing the weight of the aircraft body, thereby compressing the system cost and fuel cost.

Reversely, media converting unit 22 separates upstream optical data received out of optical data dh from downstream optical data using a WDM filter and converts the resulting data into electric data de using a photodetector such as a photodiode. If the electric data de is communication data, processing unit 21 transmits the communication data through wireless communications with a ground station. If the electric data de is maintenance data, processing unit 21 checks a state of each function of optical data transmission system 1 for a failure. If the electric data de is content requesting data, processing unit 21 reads requested content data from storing unit 23 according to the identifier of a requested content; and the identifier of a content requesting terminal (a terminal requesting this specific content), where both identifiers are contained in the content requesting data. Then, processing unit 21 adds the identifier of the content requesting terminal to the content data. In other words, processing unit 21 associates the content data having been read to a terminal corresponding to the identifier of the content requesting terminal.

(3) Terminal B1

Figure 2:
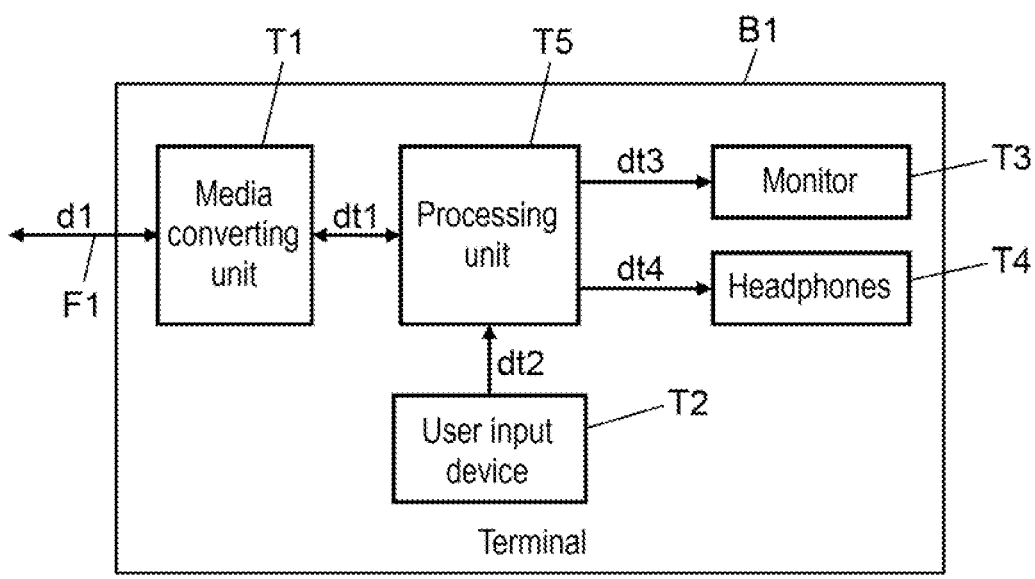
FIG. 2 is a block diagram showing a configuration example of a terminal of the optical data transmission system.

FIG. 2 is a block diagram showing a configuration example of terminal B1 of optical data transmission system 1. Terminals B2 to BN have the same configuration as terminal B1. Terminal B1 includes media converting unit T1, processing unit T5, user input device T2, monitor T3, and headphones T4.

Terminal B1 sends and receives optical data d1 through optical cable F1. Media converting unit T1 separates downstream optical data received out of optical data d1 from upstream optical data using a WDM filter and converts the resulting data into electric data dt1 using a photodetector such as a photodiode. If electric data dt1 is content data or communication data, processing unit T5 extracts data associated with terminal B1 from electric data dt1 and expands the resulting data, where such data is, for example, content data for terminal B1 whose identifier corresponds to that of the content requesting terminal. As a result, processing unit T5 generates at least one of video data and audio data. Processing unit T5 outputs the expanded video data to monitor T3 through electric data dt3, and outputs the expanded audio data to headphones T4 through electric data dt4. If electric data dt1 is maintenance data, processing unit T5 writes a state of each function of terminal B1 to maintenance data. Terminal B1 transmits this maintenance data to head end 2 through electric data dt1 and optical data d1.

User input device T2 sends information (e.g. information on selection of a content, on start and stop of playing a content) having been input by a passenger to processing unit T5 through electric data dt2. If the information having been input is requesting a specific content, processing unit T5 generates content requesting data including the identifier of the requested content and the identifier of terminal B1. Terminal B1 transmits this content requesting data to head end 2 through electric data dt1 and optical data d1.

If electric data dt1 is synchronous control data associated with terminal B1, processing unit T5 controls timing of transmitting optical data d1 so as to be made different from any timing of transmitting the other (N-1)-series optical data d2 to dN.

Further, processing unit T5 generates at least one of video data and audio data corresponding to information having been input and outputs the data to monitor T3 and headphones T4, respectively. Monitor T3 displays video data; headphones T4 outputs audio based on the audio data. Headphones T4 may be earphones. Monitor T3 may include a touch panel on its surface and user input device T2 may be the touch panel, where monitor T3 and user input device T2 are unified, which improves the usability of terminal B1.

(4) Positional Relationship Between Terminal B1 and Seat A1

Figure 3:
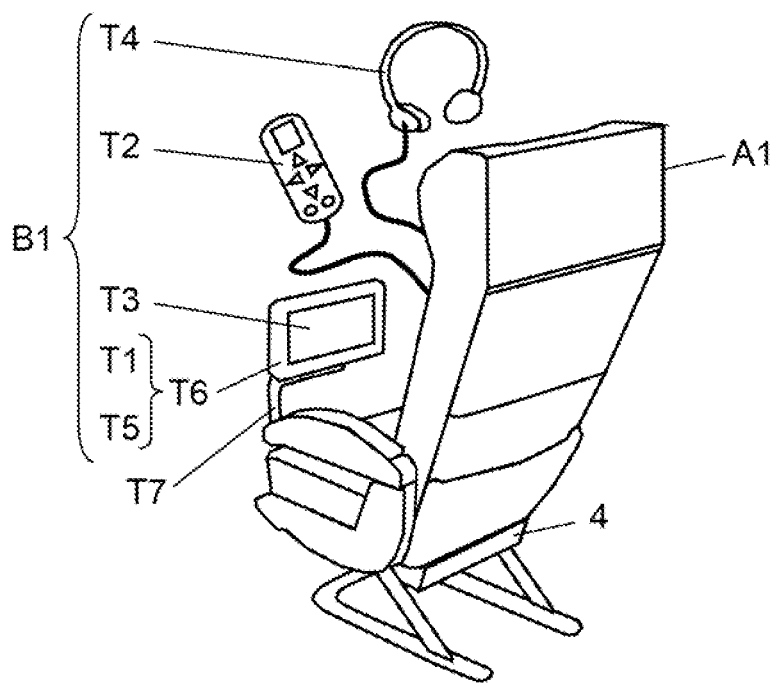
FIG. 3 is a perspective view showing a configuration example of a terminal and a seat of the optical data transmission system.

FIG. 3 is a perspective view showing a configuration example of terminal B1 and seat A1 of optical data transmission system 1. Seat A1 is being viewed from a left rear viewpoint of a passenger seated. Terminal B1 includes media converting unit T1, processing unit T5, user input device T2, monitor T3, and headphones T4. User input device T2 and headphones T4 are respectively connected to two terminals attached to an armrest of seat A1 through cords. Casing T6 covers the periphery and back surface of monitor T3 and is unified with monitor T3. Media converting unit T1 and processing unit T5 are contained in casing T6, which allows media converting unit T1, processing unit T5, and monitor T3 to be formed compactly for a limited space of a seat being seated by a passenger. Casing T6 is attached to seat A1 through supporting part T7. Monitor T3 and casing T6 may be attached to the backrest of the seat in front of seat A1.

As described above, optical splitter 4 is placed in association with seat group 3 including seats A1 to AN. In FIG. 3, optical splitter 4 is attached to the underside of the seating surface of seat A1, for example. Optical splitter 4 may be attached to another position. This allows optical splitter 4 to be placed at a desired position of seat A1 that does not block passengers. This enables constructing optical data transmission system 1 with a high degree of flexibility. Optical splitter 4 may be placed across at least two seats out of seats A1 to AN. This allows optical splitter 4 to be placed close to seats A1 to AN, thereby minimizing the total wiring length of optical cables Fh and F1 to FN. Further, optical splitter 4 is one part attached to seat group 3, which facilitates installation and replacement in the unit of seat group 3. Optical cable F1 connected between optical splitter 4 and terminal B1 penetrates the inside of supporting part T7. Media converting unit T1 may be attached to the underside of the seating surface of seat A1 rather than in casing T6, and the electrical wiring for transmitting electric data dt1 may penetrate the inside of supporting part T7.

(5) Optical Splitter 4

Figure 4:
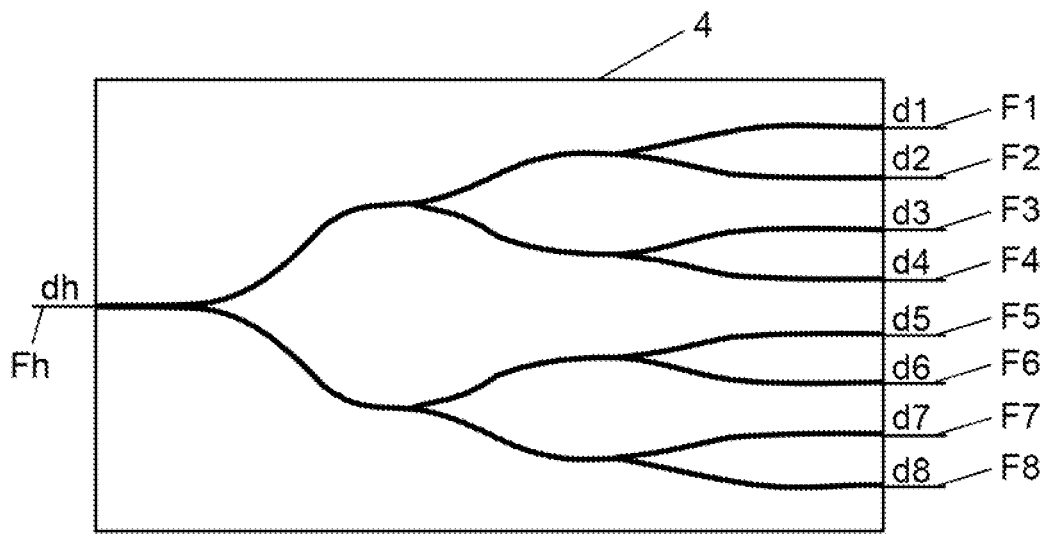
FIG. 4 is a schematic diagram showing a configuration example of a balanced optical splitter of the optical data transmission system.

FIG. 4 is a schematic diagram showing a configuration example of optical splitter 4 of optical data transmission system 1. In optical splitter 4, the path connected to optical cable Fh is two-way-split at every one level, resulting in 8-way branches at three levels. The 8-way-split paths are respectively connected to eight optical cables F1 to F8. Optical splitter 4 duplicates optical data dh from head end 2 to generate 8-series optical data d1 to dN (N=8) equivalent to optical data dh and sends them respectively to terminals B1 to BN (N=8). Reversely, optical splitter 4 unifies optical data d1 to dN (N=8), with different generation timings from one another, from terminals B1 to BN (N=8) into one series to generate one-series optical data dh and sends it to head end 2. This allows optical splitter 4 to multiplex optical data d1 to d8 from terminals B1 to B8 using time division multiple access (TDMA). Here, the description is made for N=8; however, N may be any number as long as it is 2's power such as 2, 4, 8, 16, or 32.

In this way, optical splitter 4 is a balanced optical splitter. With balanced optical splitter 4, assuming that P0 is optical power representing optical intensity of optical data dh input to optical splitter 4 through optical cable Fh, optical power of optical data d1 to d8 output from optical splitter 4 through eight optical cables F1 to F8 is evenly divided into eight, P0/8 each.

Optical splitter 4 is formed of a planar lightwave circuit (PLC) made of such as a quartz-based material. Here, how optical splitter 4 is formed is not limited to this way, but another way may be used.

(6) Optical Data Transmission System 1a Including Optical Splitter 5

Figure 5:
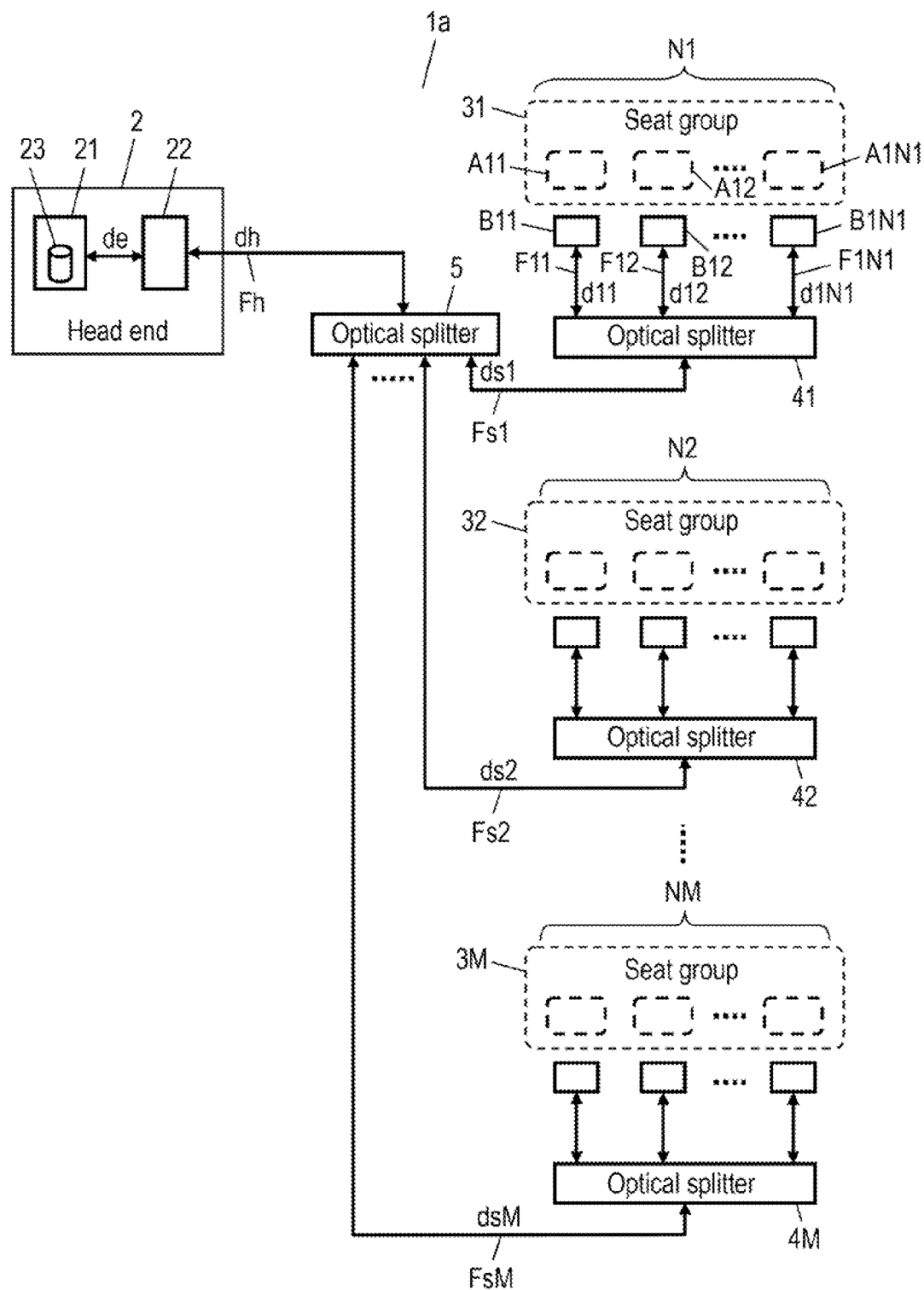
FIG. 5 is a block diagram showing a configuration example of an optical data transmission system in deformed example 1 according to the embodiment of the present invention.

FIG. 5 is a block diagram showing a configuration example of optical data transmission system 1a in deformed example 1. The reference marks of optical splitter 4, terminals B1 to BN, optical cables F1 to FN, optical data d1 to dN, and seat group 3 in optical data transmission system 1 are respectively changed to optical splitter 41; N1 units of terminals B11, B12, . . . , B1N1; N1 pieces of optical cables F11, F12, . . . , F1N1; N1-series optical data d11, d12, . . . , d1N1; and seat group 31 in optical data transmission system 1a, where N1 is an integer larger than 1. Further, the reference marks of seats A1 to AN in optical data transmission system 1 are changed to N1 sets of seats A11, A12, . . . , A1N1.

Optical data transmission system 1a includes M (M is an integer larger than 1) sets of optical splitter 41, terminals B11 to B1N1 (N1 is changeable as described later), optical cables F11 to F1N1, and seat group 31. Consequently, optical data transmission system 1a includes M units of optical splitters 41, 42, ..., 4M, and M sets of seat groups 31, 32, ..., 3M, where the numbers of terminals and optical cables are changeable to N1, N2, ..., NM, respectively, correspondingly to seat groups 31 to 3M.

Optical data transmission system 1a further includes optical splitter 5 (second optical splitter) and M pieces of optical cables Fs1, Fs2, ..., FsM. Optical splitter 5 is a passive element. Optical cable Fh is connected between head end 2 and optical splitter 5, and optical cables Fs1 to FsM are respectively connected between optical splitter 5 and optical splitters 41 to 4M. This allows optical cables Fh and Fs1 to FsN to transmit two-way optical data dh and ds1 to dsM including downstream optical data (from head end 2 to each of optical splitters 41 to 4M) and upstream optical data (from each of optical splitters 41 to 4M to head end 2), respectively. Optical splitter 5 sends optical data dh from head end 2 equivalently to optical splitters 41 to 4M; reversely, unifies M-series optical data ds1 to dsM (can be different from one another) from optical splitters 41 to 4M, into one series and sends the resulting data to head end 2.

In more detail, optical splitter 5 duplicates optical data dh from head end 2 to generate M-series optical data ds1 to dsM equivalent to optical data dh, and sends the resulting data to optical splitters 41 to 4M, respectively. Reversely, optical splitter 5 unifies optical data ds1 to dsM, with different generation timings from one another, from optical splitters 41 to 4M into one series to generate one-series optical data dh and sends it to head end 2. This allows optical splitter 5 to multiplex optical data ds1 to dsM from optical splitters 41 to 4M using time division multiple access.

For example, assuming M=32, N1=N2= ... =NM=32, optical data transmission system 1a can include a maximum of 1,024 terminals. As a result, the world's largest aircraft in existence can be equipped with terminals for an in-flight entertainment (IFE) system on all the seats, even if they are all for the economy class. Further, wiring of optical cables Fh and Fs1 to FsM can be simplified, which further compresses the system cost.

(7) Optical Data Transmission System 1b Including Switching Hub 6

Figure 6:
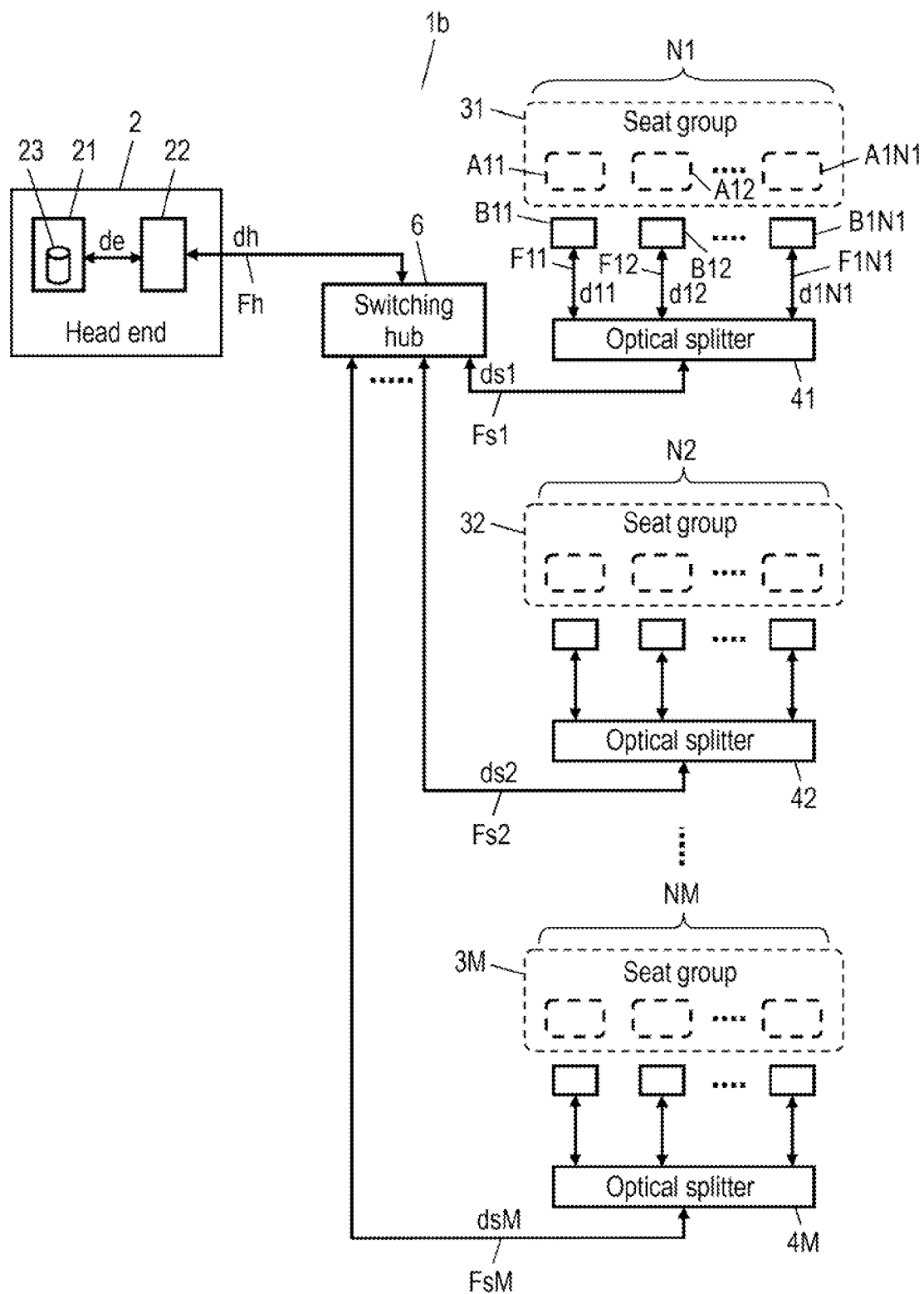
FIG. 6 is a block diagram showing a configuration example of an optical data transmission system in deformed example 2 according to the embodiment of the present invention.

FIG. 6 is a block diagram showing a configuration example of optical data transmission system 1b in deformed example 2. System 1b includes switching hub 6 instead of optical splitter 5 in optical data transmission system 1a. Switching hub 6 is connected between head end 2 and optical splitters 41 to 4M. Switching hub 6 switches optical data dh from head end 2 to divide optical data dh into M-series optical data ds1 to dsM and sends them to optical splitters 41 to 4M, respectively. Reversely, switching hub 6 switches optical data ds1 to dsM from optical splitters 41 to 4M to generate one-series optical data dh and sends it to head end 2.

Here, switching hub 6 includes M pieces of delay circuits, which enables adjusting timing of generating optical data ds1 to dsM, and thus the timing does not need to be made different preliminarily.

For example, assuming M=32, N1=N2= ... =NM=32, optical data transmission system 1b can include a maximum of 1,024 terminals. As a result, the world's largest aircraft in existence can be equipped with terminals for an in-flight entertainment (IFE) system on all the seats, even if they are all for the economy class. Further, wiring of optical cables Fh and Fs1 to FsM can be simplified while minimizing insertion loss between head end 2 and optical splitters 41 to 4M, which further compresses the system cost.

(8) A Detailed Configuration Example of Optical Data Transmission System 1a

Figure 7:
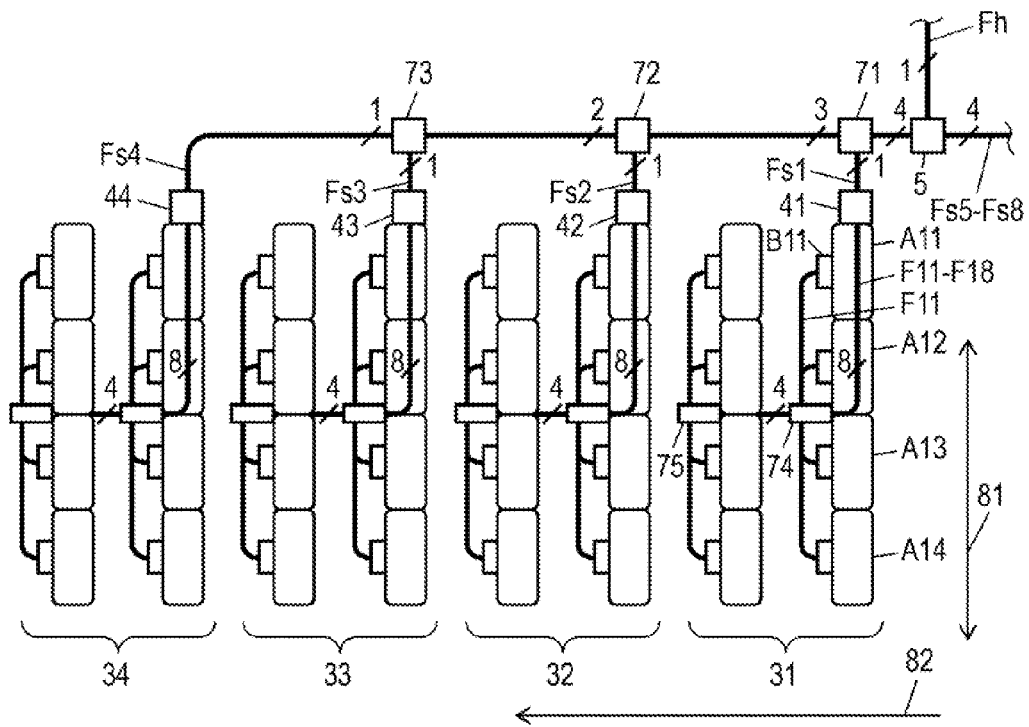
FIG. 7 is a block diagram showing a detailed configuration example of the optical data transmission system in deformed example 1.

FIG. 7 is a block diagram showing a detailed configuration example of optical data transmission system 1a. Here, a description is made of a configuration near the center of a seat arrangement for the economy class of a large-size aircraft, for example. Arrow 81 represents the widthwise direction of the aircraft body; arrow 82, the lengthwise direction, indicating the snout. Seat groups 31, 32, 33, 34 are aligned in the lengthwise direction of the aircraft body. Each of seat groups 31 to 34 includes a total of eight seats: four seats in the widthwise direction of the aircraft body and two rows of seats in the lengthwise direction of the aircraft body. For example, seat group 31 includes seats A11, A12, A13, A14 in the widthwise direction of the aircraft body. There are aisles provided at both sides of seats A11 to A14 in the lengthwise direction of the aircraft body. Hence, each of seat groups 31 to 34 is not separated by an aisle, and eight seats in each of seat groups 31 to 34 are arranged close to one another.

Optical data transmission system 1a includes branches 71, 72, 73, 74, 75. Optical splitter 5 splits optical cable Fh into eight optical cables Fs1 to Fs8. Optical splitter 5 is connected to head end 2 through optical cable Fh and connected to branch 71 through optical cables Fs1 to Fs4. Optical splitter 5 is connected to the configuration similar to that connected through optical cables Fs1 to Fs4, through optical cables Fs5 to Fs8. Branch 71 splits optical cables Fs1 to Fs4 into optical cable Fs1 and optical cables Fs2 to Fs4, and is connected to optical splitter 41 through optical cable Fs1.

Optical splitter 41 splits optical cable Fs1 into eight optical cables F11 to F18. Optical splitter 41 is attached to seat A11 in the same way as the relationship between optical splitter 4 and seat A1 in FIG. 3, for example. Further, optical splitter 41 is connected to branch 74 through optical cables F11 to F18. Branch 74 splits optical cables F11 to F18 into optical cables F11 to F14 and optical cables F15, to F18, and is connected to branch 75 through optical cables F15 to F18. Further, branch 74 is connected to terminal B11 through optical cable F11. Terminal B11 is attached to seat A11 in the same way as the relationship between terminal B1 and seat A1 in FIG. 3, for example.

Branches 71 to 75 are formed in a connector style. For example, optical cable Fs1 is attachable to and detachable from branch 71 through a connector. Herewith, seat group 31 including seats A11 to A18 can be delivered from a seat vendor in one set with optical splitter 41; terminals B11 to B18; branches 74, 75; and optical cables Fs1 and F11 to F18, all attached, which facilitates installation and replacement of the system.

Figure 9:
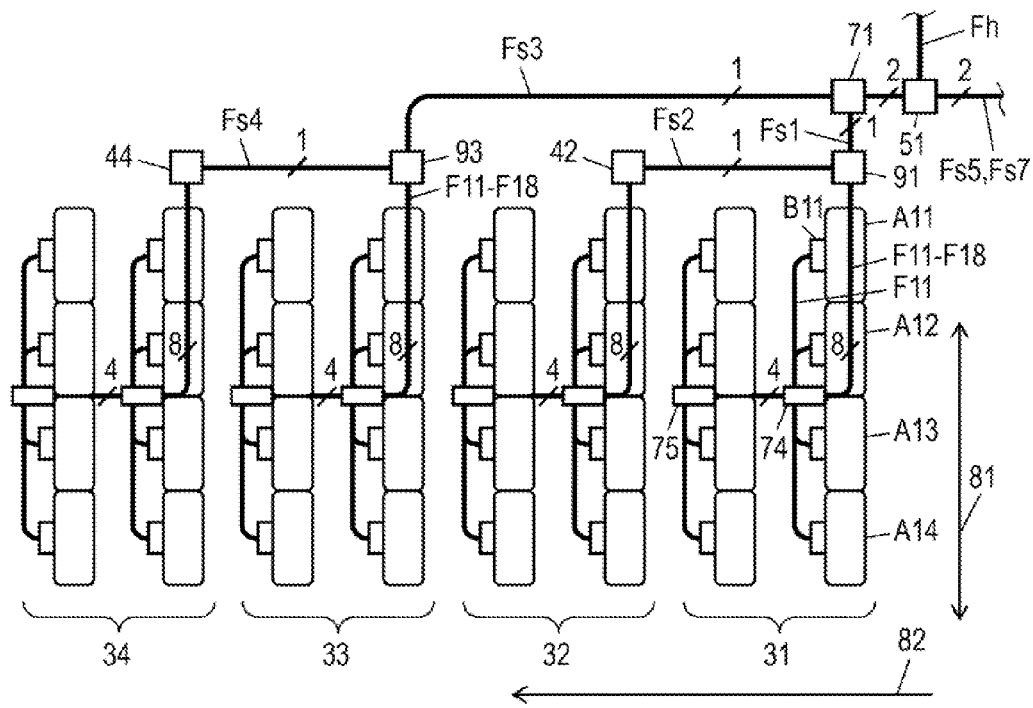
FIG. 9 is a block diagram showing another detailed configuration example of an optical data transmission system in deformed example 1.

FIG. 9 is a block diagram showing a detailed configuration example of data transmission system 1a in which optical splitters 41, 43 in FIG. 7 are replaced with optical splitters 91, 93, and from which branches 72, 73 are removed. All the optical splitters 41 to 4M and 5 used in above-described data transmission systems 1a, 1b are balanced, while optical splitters 91, 93 in the application example shown in FIG. 9 are unbalanced. A balanced optical splitter splits light having been input into plural series of light with even optical intensity and outputs the resulting light. Meanwhile, an unbalanced optical splitter splits light having been input into plural series of light with uneven optical intensity and outputs the resulting light.

Figure 10:
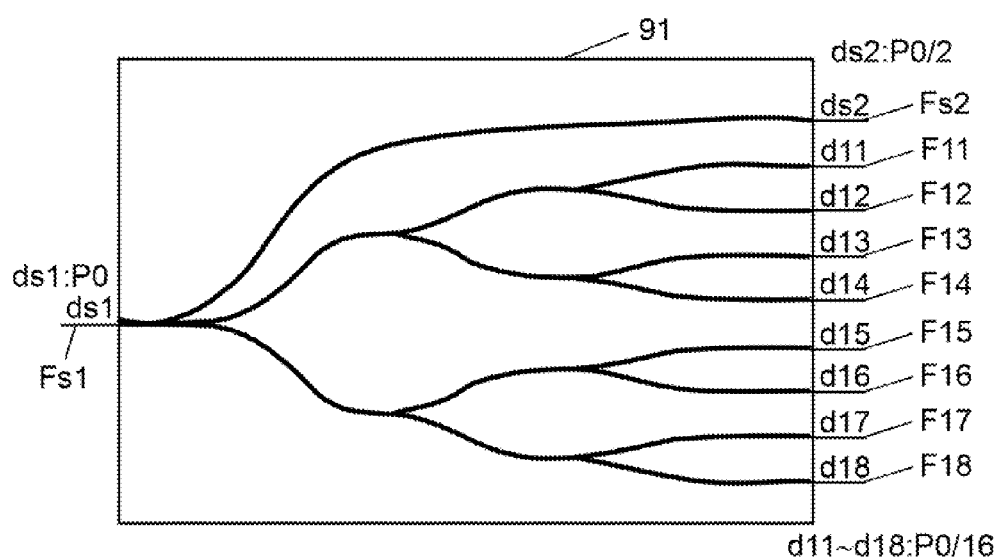
FIG. 10 is a schematic diagram showing a configuration example of an unbalanced optical splitter of the optical data transmission system.

In FIG. 9, balanced optical splitter 51 splits optical cable Fh into four pieces of optical cables Fs1, Fs3, Fs5, Fs7. Optical cable Fs1 split by branch 71 is connected to optical splitter 91;

similarly, optical cable Fs3 split by branch 71 is connected to optical splitter 93. FIG. 10 is a schematic diagram showing a configuration example of optical splitter 91. Here, optical splitter 91 is assumed to receive optical data ds1 of optical power P0 as input. Unbalanced optical splitter 91 is different from balanced optical splitter 4 in FIG. 4 as follows. That is, as shown in FIG. 10, optical data is split into two series near the input point inside optical splitter 91. One is not further split with its optical power attenuated to P0/2, and is output to optical cable Fs2 as optical data ds2. The other is sequentially split into two, four, and eight series completely in the same way as in optical splitter 4, with each of their optical power attenuated to P0/16, and is output to optical cables F11 to F18 as optical data d11 to d18. In this way, the unbalanced optical splitter splits light having been input into first optical output (optical data ds with large optical power and plural series of second optical output (optical data d11 to d18) with optical power smaller than the first optical output.

Optical cable Fs2 connected to optical splitter 91 is connected to balanced optical splitter 42. Optical cables F11 to F18 connected to optical splitter 91 are respectively connected to terminals B11 to B18 placed on seats A11 to A18 of seat group 31. Meanwhile, optical cables F11 to F18 connected to optical splitter 42 are connected to terminals B11 to B18 placed on seats A11 to A18 of next seat group 32.

Thus in this application example, unbalanced optical splitters 91, 93 are used to split light having been input into unbalanced output: first optical output with large optical power and plural series of second optical output with optical power smaller than the first optical output. Then, the first optical output with large optical power is connected to the input of another optical splitter while the second optical output with smaller optical power is output to each terminal in the seat group, thereby reducing the amount of wiring optical cables. In comparison with FIG. 7, this application example allows reducing the amount of wiring from optical splitter 5 from eight to four pieces and transmitting optical data to the same seat groups 31 to 34. Here, examples of an unbalanced optical splitter include a waveguide optical splitter.

Figure 11:
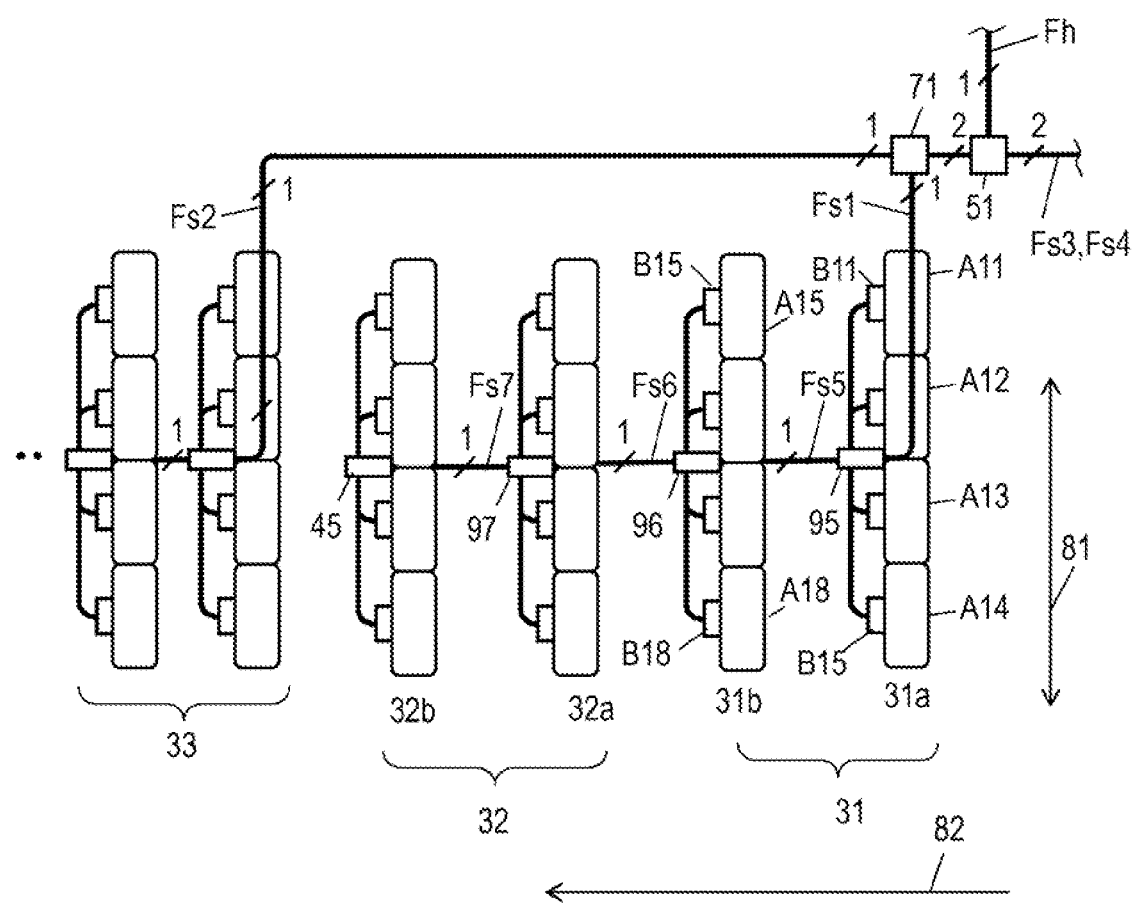
FIG. 11 is a block diagram showing another detailed configuration example of an optical data transmission system in deformed example 1.

FIG. 11 shows a detailed configuration example of another application example using an unbalanced optical splitter. FIG. 11 shows the part of seat groups 31, 32 in FIG. 7 enlarged. In this application example, seat group 31 is divided into two seat groups 31a and 31b; similarly, seat group 32 is divided into two seat groups 32a and 32b. Seat groups 31a, 32a include seats A11 to A14 (terminals B11 to B14); seat groups 31b, 32b include seats A15 to A18 (terminals B15 to B18).

In this application example, optical splitters 95, 96, 97 are unbalanced; optical splitter 45 is balanced. Optical input with optical power P0 having been input to optical splitter 95 placed in seat group 31a through optical cable Fs1 is split into one optical output (optical power of 3P0/4) and four series of optical output (optical power of P0/16). Then, the one optical output of 3P0/4 is connected to the input of optical splitter 96 through optical cable Fs5. The four series of optical output of P0/16 is connected to four terminals B11 to B14 of seat group 31a through four pieces of optical cables. Similarly, in optical splitter 96, one optical output of P0/2 is connected to the input of optical splitter 97 placed in seat group 32a through optical cable Fs6, and four series of optical output of P0/16 is connected to four terminals B15 to B18 of seat group 31b through four pieces of optical cables. Similarly, in optical splitter 97, one optical output of P0/4 is connected to the input of optical splitter 45 placed in seat group 32b through optical cable Fs7, and four series of optical output of P0/16 split by optical splitter 45 is connected to four terminals B15 to B18 of seat group 32b through four pieces of optical cables. In this way, three units of unbalanced optical splitters 95, 96, 97 and balanced optical splitter 45 are cascaded as shown in FIG. 11, which significantly reduces the amount of wiring between seat groups 31a, 31b, 32a, 32b as compared to FIG. 7.

Figure 12:
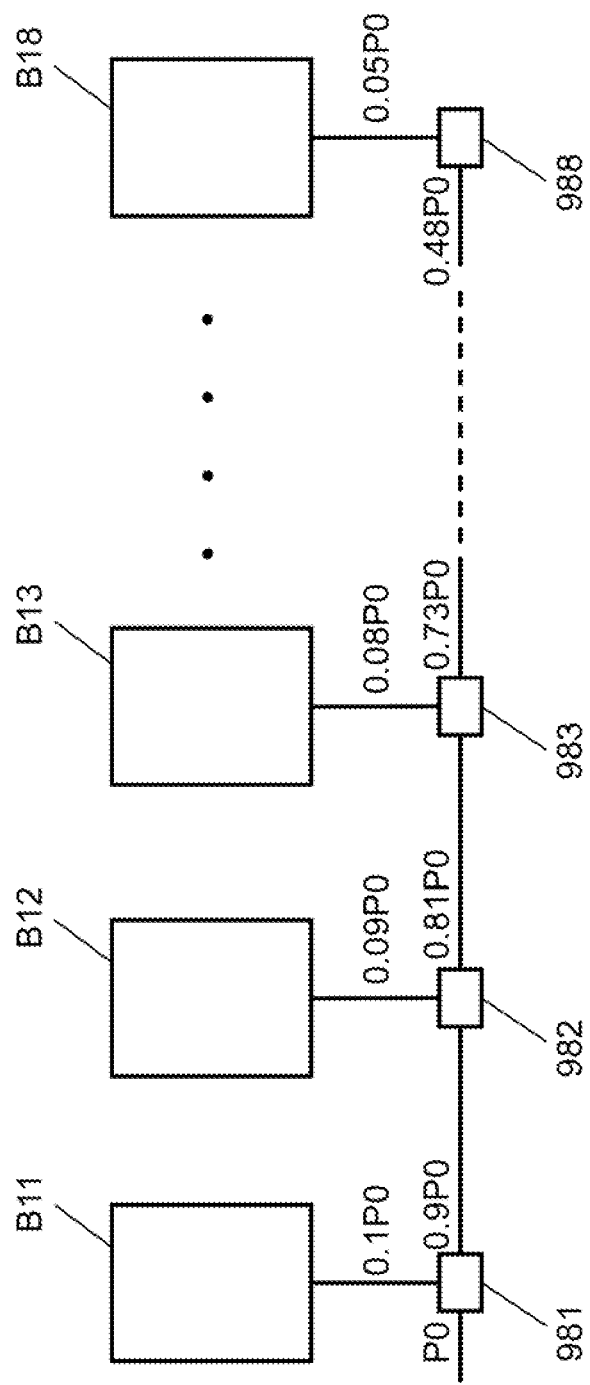
FIG. 12 shows an example of terminals connected in cascade where one unbalanced optical splitter with the same branching ratio corresponds to each terminal.

In the example shown in FIG. 11, the branching ratios of unbalanced optical splitters 95, 96, 97 are 3:1, 2:1, and 1:1, respectively (different from one another) so that optical power of light received by respective terminals B11 to B18 are the same. Here, the branching ratio of an unbalanced optical splitter is defined as the ratio of the total optical power of the second optical output to that of the first optical output. Each of optical splitters 95, 96, 97 five-way-splits optical input into one-series first optical output and four-series second optical output, to supply the four series to four terminals. On the other hand, FIG. 12 shows an example of terminals connected in cascade where one unbalanced optical splitter with the same branching ratio corresponds to each terminal. Here, the unbalanced optical splitter is two-way-splitting optical input into one-series first optical output and one-series second optical output. In the example of FIG. 12, optical splitters 981, 982, 983, . . . , 988 (each branching ratio is 9:1) are made correspond to terminals B11, B12, B13, . . . B18, respectively.

That is, when light of optical power P0 is input to optical splitter 981, the optical power is two-way-split into 0.9P0 of first optical output and 0.1P0 of second optical output. Then, the first optical output is input to next-stage optical splitter 982, and the second optical output is input to terminal B11. Similarly, in optical splitter 982, the optical power is two-way-split into 0.81P0 of first optical output and 0.09P0 of second optical output. Then, the first optical output is input to next-stage optical splitter 983, and the second optical output is input to terminal B12. In the other optical splitters, unbalanced split is repeated in the same way, and 0.05P0 of light is input to terminal B18 from optical splitter 984. In this way, the same branching ratio of each optical splitter causes optical power input to each terminal to be gradually attenuated. Consequently, the same branching ratio of each optical splitter allows optical splitters with the same specifications to be used even if a splitter is contained in each terminal, which lowers the production cost of terminals. Further, commonality of terminals allows a faulty terminal to be exchanged easily while an optical splitter remains built in.

In the meantime, with an aircraft or other vehicle, different services can be requested depending on a seat (terminal) position, and thus identifying a seat position is important. In FIG. 1, to communicate between terminals B1 to BN included in each seat and head end 2, all the in-flight terminals B1 to BN are given different IP addresses. If each seat is fixed, and when a terminal is installed on a seat, if the terminal is preliminarily given a fixed IP address corresponding to its seat position, the head end that has received communication data from the terminal can uniquely identify the seat position from the IP address of the source terminal. In some cases, however, a seat position is unable to be identified such as when seats are rearranged or a faulty terminal is replaced. The difference in optical power input to the respective terminals allows matching a terminal position (seat position) to its IP address without preliminarily setting a fixed IP address corresponding to a seat position, by measuring optical power received and transmitting a pair of the optical power and the IP address of the terminal freely given. This allows providing optimum services in the aircraft according to a seat position.

Figure 13A:
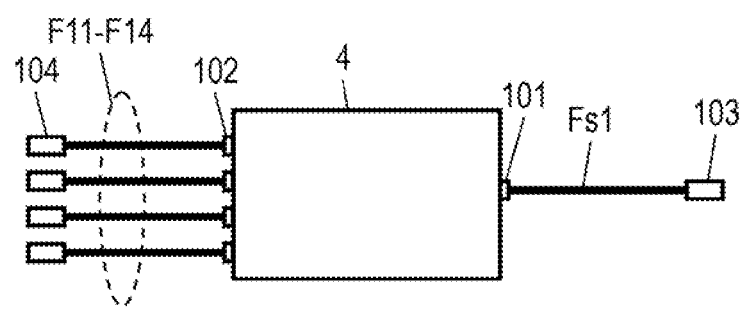
FIG. 13A shows a configuration example of an optical splitter separated from a fiber-optic cable in an optical data transmission system according to an embodiment of the present invention.
Figure 13B:
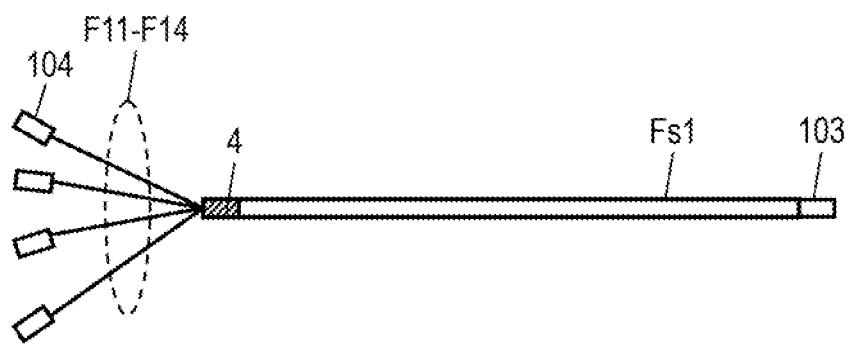
FIG. 13B shows a configuration example of an optical splitter contained in a fiber-optic cable in the optical data transmission system according to an embodiment of the present invention.

In the above embodiment, the description is made assuming that optical splitter 4 includes connectors 101, 102 at the input/output part thereof as shown in FIG. 13A, and optical cable Fs1 is connected to connector 101. Instead, as shown in FIG. 13B, optical splitter 4 may be contained in optical cable Fs1 to extract optical cables F11 to F14 directly from optical splitter 4. Connector 103 is a connector attached to the other end of optical cable Fs1; connector 104 is a connector attached to the other ends of optical cables F11 to F14. To simplify the description, the number of series split by optical splitter 4 is assumed to be four. Such optical splitter 4 contained in optical cable Fs1 allows achieving further downsizing and weight reduction.

(9) Summary of Exemplary Embodiments

The numerical values described hereinbefore are exemplified to describe the present invention concretely, and do not limit the present invention. For some of the components in the above-described embodiments, reconfiguring an embodiment in a combination different from that in the above-described embodiments, within the intended range of the present invention, can present advantages in the combination.

All the descriptions hereinbefore in the embodiments are for an example of embodying the present invention, and do not limit the present invention. Those skilled in the art can easily develop various kinds of examples from the techniques of the present invention.

As described hereinbefore, an optical data transmission system of the present invention is a system for transmitting optical data. The system includes a head end for sending and receiving optical data; at least one first optical splitter as a passive element; N units of terminals for outputting video, audio, and other data by processing optical data received from the first optical splitter; plural pieces of optical cables connected between the head end and the first optical splitter and between the first optical splitter and the terminals, for transmitting optical data; and a seat group including N sets of seats arranged close to one another. The N units of terminals are arranged in association with the N sets of seats, respectively. The first splitter splits one series of optical data from the head end and sends the data to the N units of terminals.

Herewith, the first optical splitters, small-size and lightweight and requiring no power supply wiring, can be placed at a desired position that does not block passengers in a sheet arrangement of a flight vehicle. This enables constructing an optical data transmission system with a high degree of flexibility. Furthermore, with first optical splitters being placed in association with a seat group, a seat group including N sets of seats, N units of terminals, and a first optical splitter are delivered in one set from a seat vendor, which facilitates installation and replacement of the system. Further, with optical cables being connected between the head end and the first optical splitter and between the first optical splitter and the N units of terminals, the entire path from the head end to the terminals is implemented with optical cables and the first optical splitter unifies N pieces of optical cables, which minimizes the total wiring length of optical cables. This enables compressing the component cost of optical cables while reducing electromagnetic interference (EMI) and the weight of the aircraft body, which compresses the system cost and fuel cost.

An optical data transmission system of the present invention may further includes a second optical splitter, a passive element connected between the head end and the first optical splitter, where the second optical splitter sends optical data from the head end to at least one first optical splitter; reversely, unifies at least one series of optical data, different from one another, from at least one first optical splitter, into one series and sends it to the head end.

As a result, the world's largest aircraft in existence can be equipped with terminals for an in-flight entertainment (IFE) system on all the seats. Further, wiring of optical cables between the head end and a first optical splitter can be simplified, which further compresses the system cost.

An optical data transmission system of the present invention may further includes a switching hub connected between the head end and a first optical splitter, where the switching hub switches optical data from the head end to divide the data into one or more series and sends them to one or more first optical splitters, respectively; reversely, switches optical data from one or more first optical splitters to unify the data and sends it to the head end.

As a result, the world's largest aircraft in existence can be equipped with terminals for an IFE system on all the seats. Further, wiring of optical'cables between the head end and first optical splitters can be simplified while minimizing insertion loss between the head end and first optical splitters, which further compresses the system cost.

In an optical data transmission system of the present invention, N units of terminals may be respectively attached to N sets of seats, and a first optical splitter may be attached to a seat group.

As a result, a first optical splitter is one part attached to a seat group, which facilitates installation and replacement in the unit of a seat group. Further, a first optical splitter is placed close to N sets of seats, thereby minimizing the total wiring length of optical cables.

In an optical data transmission system of the present invention, a first optical splitter may be attached to at least one of N sets of seats in a seat group.

As a result, a first optical splitter can be placed at a desired position of a seat that does not block passengers, which enables constructing an optical data transmission system with a high degree of flexibility.

In an optical data transmission system of the present invention, optical cables may be fiber-optic cables.

In an optical data transmission system of the present invention, optical cables may transmit two-way optical data with wavelengths different from each other.

This enables two-way communications by wavelength division multiplexing (WDM) by using one optical cable, which simplifies wiring of optical cables while reducing the weight of the aircraft body, thereby compressing the system cost and fuel cost.

An optical data transmission system of the present invention may be configured and operate as follows. That is, a terminal includes a media converting unit, a processing unit, a user input device, and a monitor, where the media converting unit converts optical data from a first optical splitter into electric data; the user input device sends information having been input to the processing unit; the processing unit extracts data associated with a terminal from the electric data and processes the resulting data to generate video data while generating audio data corresponding to information having been input; and the monitor displays the video data.

In an optical data transmission system of the present invention, the monitor may include a touch panel, which may be used as the user input device.

This improves the usability of a terminal.

In an optical data transmission system of the present invention, the processing unit and the monitor may be unified with each other.

This allows the processing unit and the monitor to be formed compactly for a limited space under a seat.

An optical data transmission system of the present invention may operate as follows. That is, the head end makes optical data contain N-series synchronous control data respectively associated with N units of terminals; each terminal controls timing of transmitting optical data according to synchronous control data associated in the optical data to make the timing different from those of the other (N-1) series of optical data.

This allows the first optical splitter to multiplex optical data from each terminal using time division multiple access (TDMA).

With an optical data transmission system of the present invention, the flight vehicle may be equipped with plural seat rows composed of plural seats adjacent to one another, and a seat group may include plural seat rows.

An optical data transmission system of the present invention may be configured and operate as follows. That is, the first optical splitter is an unbalanced optical splitter that splits light having been input into first optical output with large optical power and plural second optical output with optical power smaller than that of the first optical output; splits one-series optical data from the head end; sends the second optical output to N units of terminals associated with one seat group while sending the first optical output to another balanced or unbalanced optical splitter connected to another seat group.

This allows the optical data transmission system to split optical power having been input to an optical splitter in an unbalanced manner, which enables sending optical output with large optical power to an optical splitter placed in another seat group, thereby significantly reducing the amount of wiring between seat groups.

With an optical data transmission system of the present invention, a first optical splitter or second optical splitter may be contained in an optical cable, which implements further downsizing and weight reduction.

An optical data transmission system of the present invention is a system for transmitting optical data. The system includes a head end for sending and receiving optical data; N units of optical splitters as passive elements; N units of terminals for outputting video, audio, and other data by processing optical data received from the optical splitter; optical cables for transmitting optical data, connected between the head end and the optical splitter, between the optical splitters, and between the optical splitters and the terminals; and N sets of seats arranged close to one another. The N units of terminals are arranged in association with the N sets of seats, respectively. The N units of optical splitters are placed in association with the N units of terminals, respectively. Each of the optical splitters is an unbalanced optical splitter that splits light having been input into two-series optical output with uneven optical intensity. The splitters, mutually connected with one optical cable, successively split one-series optical data from the head end for each terminal according to the arrangement of the N sets of seats and send the resulting data to the N sets of seats. Herewith, one optical splitter can be placed in association with one terminal, and all the optical splitters can be connected with one optical cable, which reduces the wiring amount of optical cables. Further, the terminal can contain the optical splitter, which simplifies wiring of optical cables.

An optical data transmission system of the present invention may be configured and operate as follows. That is, each optical splitter is an unbalanced optical splitter that splits light having been input into first optical output with large optical power and second optical output with optical power smaller than that of the first optical output. The first optical output is input to the next-stage optical splitter, and the second optical output is input to the terminal.

Herewith, optical power with large optical output can be input to the next-stage optical splitter, which enables multiple-stage connection of optical splitters.

With the optical data transmission system of the present invention, the branching ratio of each optical splitter may be the same. This allows optical splitters with the same specifications to be used even if a splitter is contained in each terminal, which lowers the production cost of terminals. Meanwhile, commonality of terminals allows a faulty terminal to be exchanged easily while an optical splitter remains built in. Further, the difference in optical power input to the respective terminals allows matching a terminal position (seat position) to its IP address without preliminarily setting a fixed IP address corresponding to a seat position, by measuring optical power received and transmitting a pair of the optical power and the IP address of the terminal freely given.

In an, optical data transmission system of the present invention, the flight vehicle may be at least one of an aircraft, helicopter, airship, floating object connected to the ground, rocket, satellite, and space station.

What is claimed is:

1. An optical data transmission system for transmitting optical data, comprising:
    a head end for sending and receiving optical data;
    a first optical splitter that is a passive element;
    a second optical splitter that is a passive element;
    N (N is an integer larger than 1) units of terminals for outputting video, audio, and/or other data by processing optical data received from the first optical splitter;
    a plurality of optical cables for transmitting optical data, connected between the head end and the first optical splitter and between the first optical splitter and the terminals; and
    a seat group including N sets of seats disposed close to one another,
    wherein the N units of terminals are disposed in association with the respective N sets of seats,
    wherein the first optical splitter is an unbalanced optical splitter,
    wherein the first optical splitter splits one series of optical data from the head end into (i) a first optical output of a large optical intensity and (ii) a second optical output of an optical intensity smaller than the optical intensity of the first optical output,
    wherein the first optical output (i) sends the second optical output to the N units of terminals associated with the seat group and (ii) sends the first optical output to the second optical splitter, and
    wherein a ratio of the total optical power of the second optical output to the total optical power of the first optical output is a ratio of (i) the number of the N units of terminals to (ii) the number of M units of terminals downstream of the second optical splitter.

2. The optical data transmission system of claim 1, further comprising a third optical splitter that is a passive element, connected between the head end and the first optical splitter,
    wherein the third optical splitter sends optical data from the head end to the first optical splitter, and reversely unifies at least one series of optical data, different from one another, from the first optical splitter into one series and sends the resulting data to the head end.

3. The optical data transmission system of claim 1, further comprising a switching hub connected between the head end and the first optical splitter,
    wherein the switching hub switches optical data from the head end to split the data into at least one series and sends the resulting data to the first optical splitter, and reversely switches optical data from the first optical splitter to unify the data into one series and sends the resulting data to the head end.

4. The optical data transmission system of claim 1,
wherein the N units of terminals are attached to the respective N sets of seats, and the first optical splitter is attached to the seat group.

5. The optical data transmission system of claim 4,
wherein the first optical splitter is attached to at least one of the N sets of seats in the seat group.

6. The optical data transmission system of claim 1,
wherein the optical cables are fiber-optic cables.

7. The optical data transmission system of claim 1,
wherein the optical cables transmit two-way optical data with wavelengths different from one another.

8. The optical data transmission system of claim 1,
wherein each of the terminals includes a media converting unit, a processing unit, a user input device, and a monitor,
wherein the media converting unit converts optical data from the first optical splitter to electric data,
wherein the user input device sends information being input therein to the processing unit,
wherein the processing unit extracts data associated with the terminal from the electric data and processes the resulting data to generate video data while generating video data corresponding to the information being input, and
wherein the monitor displays the video data.

9. The optical data transmission system of claim 8,
wherein the monitor includes a touch panel and the user input device is the touch panel.

10. The optical data transmission system of claim 8,
wherein the processing unit and the monitor are unified with each other.

11. The optical data transmission system of claim 1,
wherein the head end makes optical data contain N series of synchronous control data associated with the respective N units of terminals,
wherein each of the terminals controls timing of transmitting the optical data according to the associated synchronous control data in the optical data to differentiate the timing from any timing of transmitting the other (N-1) series of optical data.

12. The optical data transmission system of claim 1 including a plurality of seat rows, each row comprising a plurality of seats adjacent to one another, wherein the seat group includes an integral number of the seat rows.

13. The optical data transmission system of claim 1,
wherein any of the first optical splitter and the second optical splitter is contained in the optical cable.

14. The optical data transmission system of claim 1,
wherein the optical data transmission system is placed on a flight vehicle, and the flight vehicle is at least one of an aircraft, helicopter, airship, floating object connected to the ground, rocket, satellite and space station.

15. An optical data transmission system for transmitting optical data, comprising:
a head end for sending and receiving optical data;
N units of optical splitters that are passive elements;
N units of terminals for outputting video, audio, and/or other data by processing optical data received from the optical splitters;
an optical cable for transmitting optical data, connected between the head end and one of the optical splitters, between the optical splitters, and between the respective optical splitters and the respective terminals; and
N sets of seats disposed close to one another,
wherein the N units of terminals are disposed in association with the respective N sets of seats,
wherein the N units of optical splitters are disposed in association with the respective N units of terminals,
wherein the optical splitters are unbalanced optical splitters that split light being input into two series of optical output having unbalanced optical intensities, the unbalanced optical splitters having a same branching ratio, and
wherein the optical splitters are mutually connected with one optical cable so as to be connected in cascade, split one series of optical data from the head end in a sequential order for each of the N units of terminals according to an arrangement of the N sets of seats, and send the resulting data to the terminals.

16. The optical data transmission system of claim 15,
wherein each of the optical splitters is an unbalanced optical splitter that splits light being input into first optical output of a large optical intensity and one series of second optical output of an optical intensity smaller than the optical intensity of the first optical output,
wherein the first optical output is input to the next-stage optical splitter and the second optical output is input to the terminal.

17. The optical data transmission system of claim 16,
wherein the N units of terminals are attached to the respective N sets of seats, and the N units of optical splitters are attached to the respective N sets of seats.

18. The optical data transmission system of claim 15,
wherein the optical splitters are contained in the respective terminals.

19. The optical data transmission system of claim 15,
wherein the optical splitters are contained in the optical cable.

20. The optical data transmission system of claim 15,
wherein the optical data transmission system is placed on a flight vehicle, and the flight vehicle is at least one of an aircraft, helicopter, airship, floating object connected to the ground, rocket, satellite and space station.

* * * * *